United States Patent [19]
Castoldi

[11] Patent Number: 6,064,787
[45] Date of Patent: May 16, 2000

[54] ENHANCED ISOLATION DIGITAL OPTICAL SWITCH

[75] Inventor: Andrea Castoldi, Monza, Italy

[73] Assignee: Pirelli Cavi E Sistemi S.p.A., Milan, Italy

[21] Appl. No.: 09/128,934

[22] Filed: Aug. 5, 1998

Related U.S. Application Data

[60] Provisional application No. 60/056,867, Aug. 22, 1997.

[30] Foreign Application Priority Data

Aug. 19, 1997 [EP] European Pat. Off. .............. 97114249

[51] Int. Cl.$^7$ ...................................................... G02B 6/26
[52] U.S. Cl. ................................ 385/41; 385/45; 385/14; 385/16; 385/22
[58] Field of Search ................................ 385/41, 15–31, 385/14, 39–45

[56] References Cited

U.S. PATENT DOCUMENTS

| | | | |
|---|---|---|---|
| 4,070,092 | 1/1978 | Burns | 385/22 |
| 4,243,295 | 1/1981 | Alferness | 385/14 |
| 4,775,207 | 10/1988 | Silberberg | 385/42 |
| 4,998,791 | 3/1991 | Koai | 385/22 |
| 5,594,818 | 1/1997 | Murphy | 385/8 |

FOREIGN PATENT DOCUMENTS

| | | |
|---|---|---|
| 2199848 | 3/1996 | Canada . |
| 6-313905 | 11/1994 | Japan . |
| WO 96/08932 | 3/1996 | WIPO . |
| WO 96/38756 | 12/1996 | WIPO . |

OTHER PUBLICATIONS

R.C. Alferness; Chap. 4 in "Guided–Wave Optoelectronics", T. Tamir (ed.), Springer–Verlag, Berlin, 1988, pp. 174–183.
W.K. Burns, et al.; "Active Branching Waveguide Modulator", Applied Physics Letters, vol. 29, No. 12, Dec. 15, 1976, pp. 790–792.
E.J. Murphy, et al.; "Enhanced Performance Switch Arrays for Optical Switching Networks", Proceedings of ECIO '97, Royal Institute of Technology, Sweden, Apr. 1997, pp. 563–566.
W.K. Burns; "Shaping the Digital Switch", IEEE Photonics Technology Letters, vol. 4, No. 8, Aug. 1992, pp. 861–863.
T. Findakly et al.; "Optical Directional Couplers with Variable Spacing", Applied Optics, vol. 17, No. 5, Mar. 1, 1978, pp. 769–773.

*Primary Examiner*—Phan T. H. Palmer
*Attorney, Agent, or Firm*—Finnegan, Henderson, Farabow, Garrett & Dunner, L.L.P.

[57] ABSTRACT

A digital optical switch includes an input waveguide connected to a Y-shaped branching waveguide having two legs, each of the legs being connected to an output waveguide. Each output waveguide forms one waveguide of a directional coupler, the other waveguide of which has its output dissipated into the substrate. Electrodes are connected to voltage sources such that the switch is operative between two states. In the first state, transmission of optical energy is enhanced between the input waveguide and the first output waveguide and inhibited between the input waveguide and the second output waveguide. Coupling between the first output waveguide and the other waveguide of its respective directional coupler is inhibited and coupling between the second output waveguide and the other waveguide of its respective directional coupler is enhanced. In the second state, transmission of optical energy is inhibited between the input waveguide and the first output waveguide and enhanced between the input waveguide and the second output waveguide. Coupling between the first output waveguide and the other waveguide of its respective directional coupler is enhanced and coupling between the second output waveguide and the other waveguide of its respective directional coupler is inhibited.

12 Claims, 7 Drawing Sheets

ENHANCED ISOLATION DIGITAL OPTICAL SWITCH

This application claims benefit of Provisional Application 60/056,867 filed Aug. 22, 1997.

FIELD OF THE INVENTION

The invention relates generally to optical switches and, more particularly, to an optical switch having improved isolation characteristics.

DESCRIPTION OF THE RELATED ART

Since the early days of the telephone and telegraph, communications signals have traditionally been transmitted over copper wires and cables. In recent years, however, an increasing volume of communications signals are transmitted over optical waveguides in the form of beams of light. Various types of peripheral equipment, such as connectors and switches have been developed for use with optical waveguides. In particular, a technique known as integrated optics is widely used in handling optical communications signals. Using this technique, communications signals in the form of light beams are transmitted through waveguides formed in substrates of materials such as lithium niobate ($LiNbO_3$).

Although integrated optics is now widely used in transmitting signals, the use of this technique for branching and switching functions is still limited by the difficulty of making devices with adequate characteristics. In a switching device, a signal is received at an input port and is selectively supplied to one or more output ports such that the signal either appears or is blocked at the output ports. Important performance characteristics of switching devices include:

1) isolation between outputs, that is, ratio between the optical power at a selected port ("on" state) and that at an excluded port ("off" state);
2) switching voltage, or voltage necessary to switch a port between the "on" and "off" states;
3) insensitivity to the wavelength and state of polarization of light;
4) tolerance and stability of the operating point;
5) connectivity (number of inputs and outputs);
6) loss of optical power along the device;
7) geometric dimensions.

Figure 1A:
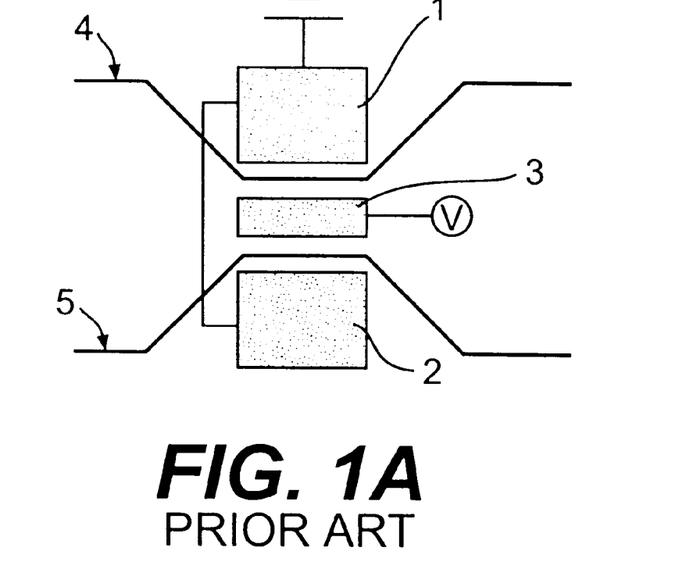
FIG. 1A is a plan view of a prior art optical switch based on a directional coupler.
Figure 1B:
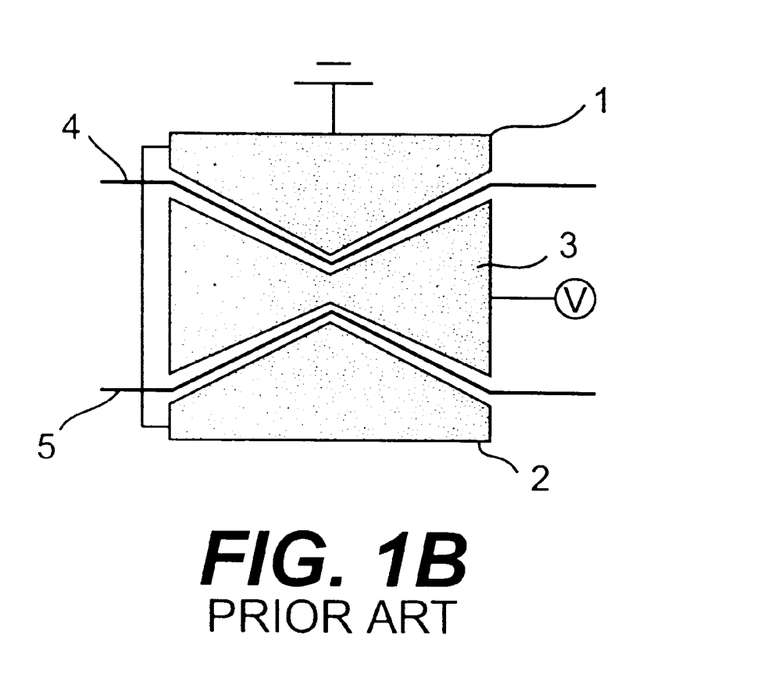
FIG. 1B is a plan view of a prior art optical switch based on a directional coupler with weighted coupling.
Figure 2:
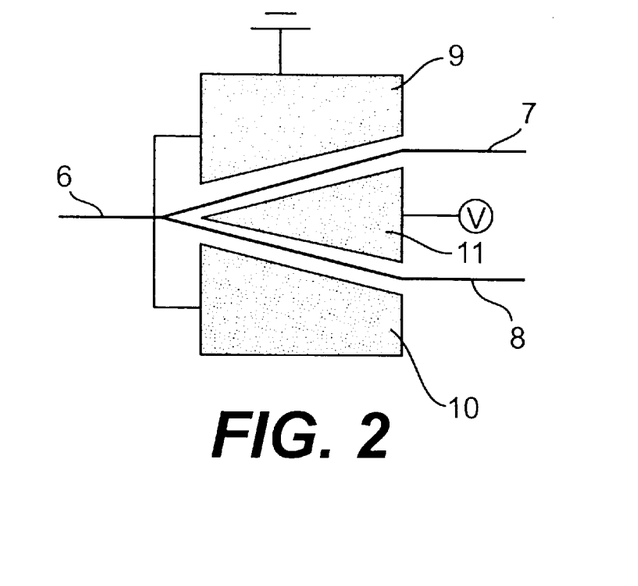
FIG. 2 is a plan view of a digital optical switch based on active branching.

Studies for making switches in integrated optics focus fundamentally on two types of devices: directional couplers (FIGS. 1A and 1B) and active branching circuits (FIG. 2). Directional couplers are disclosed and described in the following patents and publications: R. C. Alferness, chap. 4 in "Guided-Wave Optoelectronics", T. Tamir (ed.), Springer-Verlag, Berlin, 1988 and U.S. Pat. No. 4,243,295, by Alferness. Active branching circuits have also been studied and described in the prior art, for example, U.S. Pat. Nos. 4,070,092, 4,775,207, and 5,594,818 disclose and describe various characteristics of this type of circuit. This type of circuit has also been discussed in the scientific literature, for example, in "Active Branching Waveguide Modulator", by W. K. Burns, et al., Applied Physics Letters, vol. 29, no. 12, page 790, 1976.

Directional couplers have good performance for characteristic (1). However, due to the increasing oscillatory isolation response curve of directional couplers with the applied voltage, the tolerance and stability (characteristic (4)) is limited. Thus, directional couplers normally require a feedback circuit for the applied voltage, as well as monitoring of the optical channels.

Figure 3:
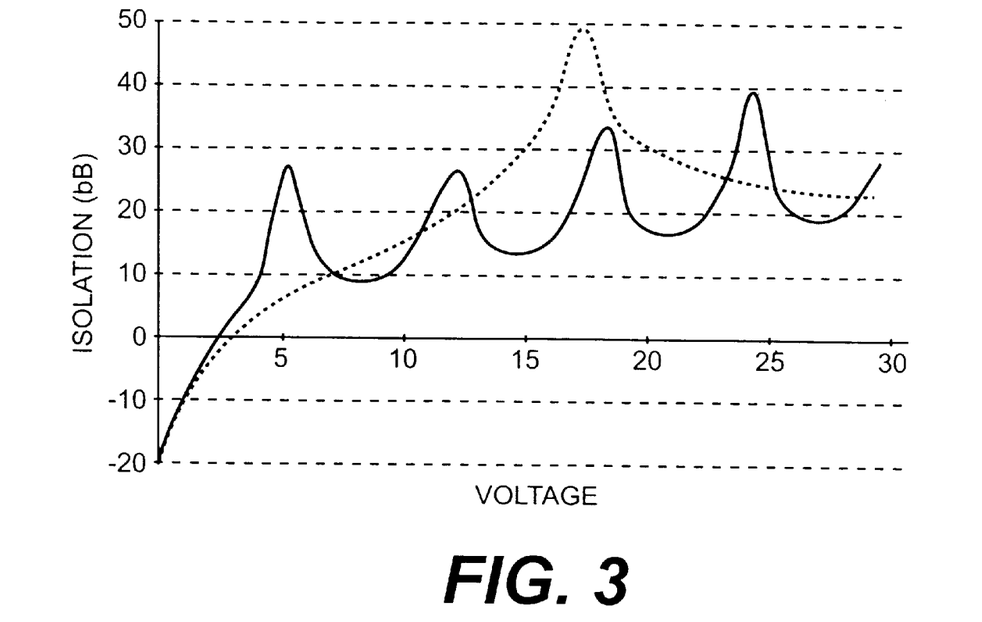
FIG. 3 is a response curve showing isolation of a switching device employing a normal directional coupler and a switching device employing weighted coupling.

These drawbacks can be overcome using a weighted coupling between the optical waveguides, which provides a response curve with almost digital-type switching voltage. This weighted coupling is achieved through a spatial tapering of the distance between the waveguides for efficient through-coupling. This technique is illustrated in FIG. 1B and is disclosed in U.S. Pat. No. 4,243,295. FIG. 3 is a graph showing the response characteristic of directional couplers, wherein the vertical axis represents isolation in dB, and the horizontal axis represent terminal potential in volts. The characteristic response of normal directional couplers is shown as a solid line in FIG. 3 and the response of directional couplers using weighted coupling is shown as a dotted line in FIG. 3.

Directional couplers exhibit another limitation, however, in that they are highly sensitive to wavelength and polarization state, particularly for birefringent materials such as lithium niobate in some crystallographic cuts. These limitations cause difficulties in the use of directional couplers as optical switches, e.g., because the optical fibers used in transmission systems generally do not maintain polarization.

Figure 4:
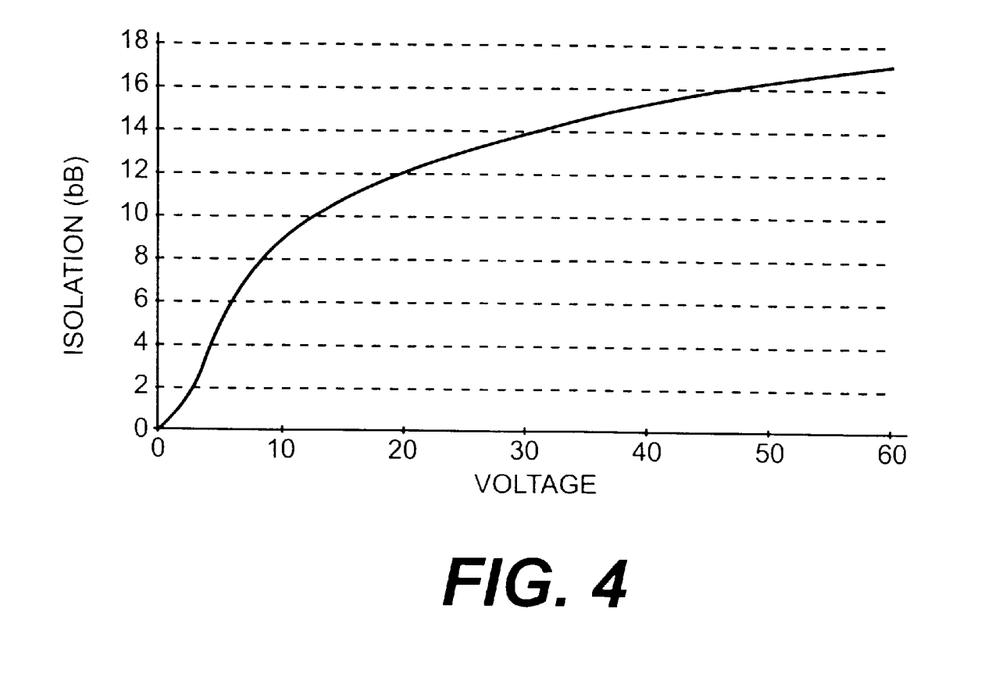
FIG. 4 is a response curve showing isolation characteristics of a digital optical switch employing active branching.

In contrast, the second type of devices, active branching devices (also known as Digital Optical Switches), have a digital-type response curve for each wavelength and state of polarization, and thus do not require a control circuit. One example of an active branching device is illustrated in FIG. 2. These circuits can be used with a fixed voltage level, which simplifies the necessary electronics. FIG. 4 illustrates the voltage required to achieve various levels of isolation in this type device. As is evident from FIG. 4, the advantages of these devices are balanced out by the high voltages necessary to obtain sufficient isolation between outputs. The required voltages may surpass those typical of directional couplers by as much as an order of magnitude.

Figure 5:
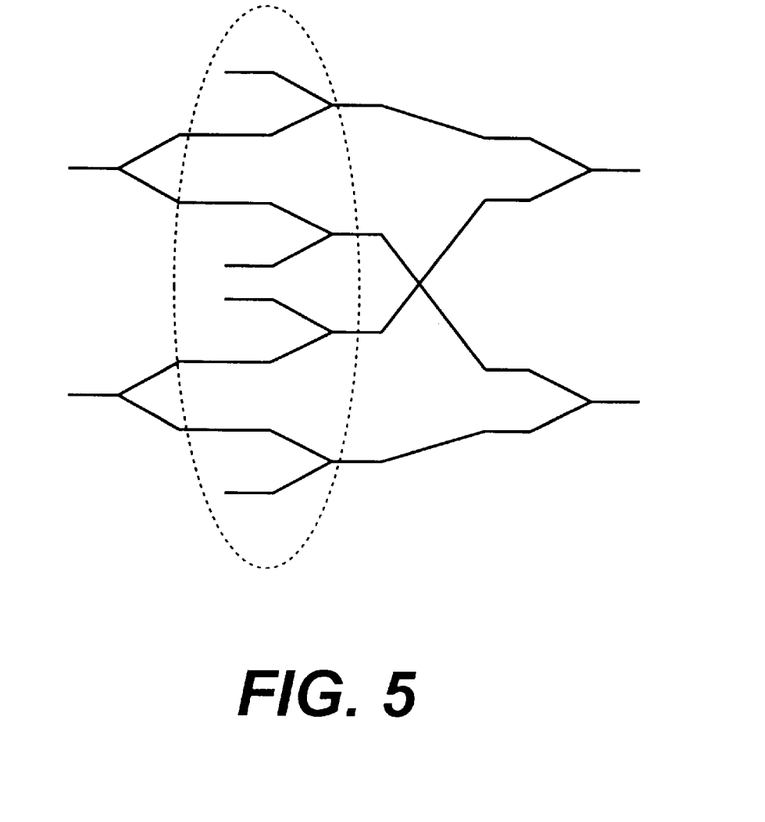
FIG. 5 is a schematic view of a 2×2 switching matrix based on a digital optical switch, using intermediate stages for increased isolation.

To obtain the same level of isolation with lower voltages in active branching devices, the prior art has suggested introducing intermediate stages that do not increase connectivity but serve only to diminish the residual power in the undesired outputs. FIG. 5 illustrates one example of this solution. This method was suggested by E. J. Murphy, et al. In the Proceedings of ECIO '97, Royal Institute of Technology, Sweden, pages 563–566. Such intermediate stages are indicated by the dotted ellipse in FIG. 5. However, this technique increases the geometrical dimensions of the device (whose maximum limit, in any case, is set by the size of the substrate chips), to the same degree as a doubling of connectivity: That is, an N×M switch with intermediate stages is in fact as long as a normal N×2M, where N is equal to the number of input ports and M is the number of output ports.

Applicant has discovered that conventional structures and methods for providing digital optical switches do not meet the needs of current applications. Applicant has further discovered apparatus and methods with improved digital optical switching characteristics which avoid the problems of the prior art. The enhanced digital optical switches discovered by applicant are much faster than opto-mechanical devices. The present invention offers for the first time the speed of integrated optical devices and the isolation of opto-mechanical devices. The present invention is less expensive to produce than opto-mechanical devices, is much more reliable, has no moving parts, and consumes less power. In short, this invention is a significant advance over the prior art in terms of opto-mechanical devices and earlier optical switches.

SUMMARY OF THE INVENTION

Additional features and advantages of the invention will be set forth in the description which follows, and in part will be apparent from the description, or may be learned by practice of the invention. The objectives and other advantages of the invention will be realized and attained by the apparatus and methods particularly pointed out in the written description and claims hereof, as well as the appended drawings.

To achieve these and other advantages, and in accordance with the purpose of the invention as embodied and broadly described, the invention includes a first directional coupler comprising first and second waveguides and a second directional coupler comprising third and fourth waveguides. The invention further includes an input waveguide, a branching waveguide connecting the input waveguide to the second and third waveguides, and a control structure coupled to the first and second directional couplers, the input waveguide, and the branching waveguide. The control structure is operative when energized to select between first and second operating states. The first state simultaneously: (1) enhances transmission of optical energy coupled from the input waveguide through the branching waveguide to the second waveguide, (2) inhibits coupling of optical energy from the second to the first waveguides, (3) inhibits transmission of optical energy coupled from the input waveguide through the branching waveguide to the third waveguide, and (4) enhances coupling of optical energy from the third to the fourth waveguides. The second state simultaneously: (1) inhibits transmission of optical energy coupled from the input waveguide through the branching waveguide to the second waveguide, (2) enhances coupling of optical energy from the second to the first waveguides, (3) enhances transmission of optical energy coupled from the input waveguide through the branching waveguide to the third waveguide, and (4) inhibits coupling of optical energy from the third to the fourth waveguides.

In another aspect, the invention includes a method for switching optical power. The method comprises receiving optical power into a Y-switch having first and second output legs each connected to a respective one of first and second output waveguide, each of the output waveguides constituting a first coupler waveguide of respective first and second directional couplers each having a second coupler waveguide; and simultaneously applying: (1) a first switching voltage to the Y-switch to cause the received optical power to switch to the first leg and be transmitted to the first coupler waveguide of the first directional coupler, (2) a second switching voltage to the first directional coupler to inhibit transfer of optical energy to the second coupler waveguide of the first directional coupler, and (3) a third switching voltage to the second directional coupler to enhance transfer of optical energy to the second coupler waveguide of the second directional coupler.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one/several embodiment(s) of the invention and, together with the description, serve to explain the principles of the invention.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION OF THE PREFERRED EMBODIMENTS

Figure 6:
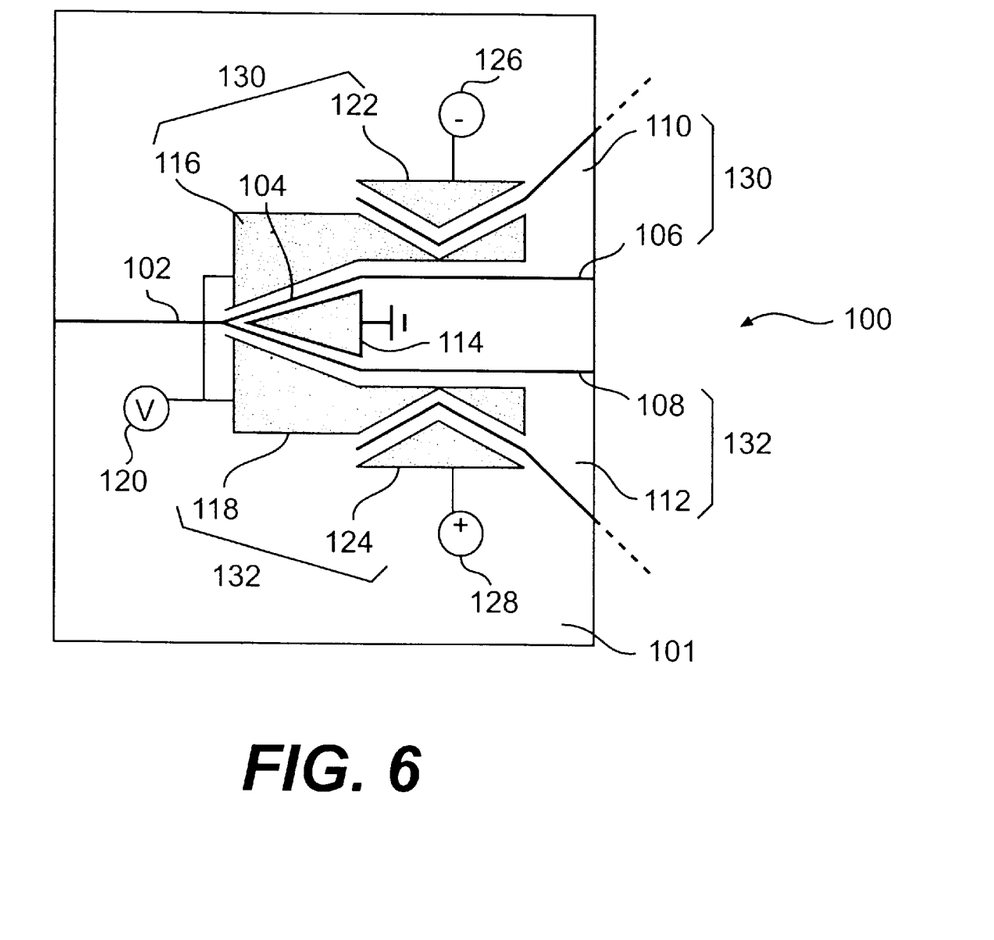
FIG. 6 is a view of a digital optical switch constructed according to the principles of the present invention.

Referring again to the drawings, FIG. 6 shows an optical switch 100 which constitutes a preferred embodiment of the present invention. Switch 100 is formed in a substrate 101 of electro-optical material, preferably lithium niobate. Preferably, the crystalline structure of substrate 101 is oriented with an X cut. As will be described later, however, the substrate may be formed of a thermo-optic material, or the invention may also be used with a Z cut lithium niobate crystal.

As shown in FIG. 6, switch 100 includes an input waveguide 102, a Y-shaped branching waveguide 104 connected to input waveguide 102 and having two output legs, and output waveguides 106 and 108 each connected to one of the legs of branching waveguide 104. Preferably, waveguides 102, 104, 106, and 108 are monomodal optical waveguides formed in a conventional manner by, for example, selectively diffusing titanium into substrate 101.

Additional waveguides 110 and 112 are also formed in substrate 101. Waveguide 110 is located with respect to waveguide 106 to form a first directional coupler. Similarly, waveguide 112 is located with respect to waveguide 108 to form a second directional coupler.

Switch 100 also includes a plurality of electrodes formed on the surface of substrate 101 in a conventional manner. A first electrode 114 is positioned between the legs of branching waveguide 104 and is connected to ground potential. A pair of outer electrodes 116, 118 are placed on opposite sides of respective legs of branching waveguide 104 from first electrode 114. Electrodes 116 and 118 are each electrically connected to a voltage source 120.

At null voltage, optical power supplied to first waveguide 102 is ideally split 50:50 between the two legs of branching waveguide 104. Upon application of voltage, the refractive index of the legs of branching waveguide 104 changes due to the electro-optical effect, the index of each leg changing an equal amount and in an opposite direction. This causes an increase in the percentage of optical power carried by the leg having the higher refractive index and an equal reduction in the optical power transmitted through the other leg. For optimal performance, electrodes 116 and 118 are extended to the point at which coupling between optical modes in the two legs of branching waveguide 104 becomes negligible. This typically happens when the waveguides are separated by 30μ or more.

Waveguides 110 and 112 are respectively formed in proximity to waveguides 106 and 108, and together with electrodes 122 and 124, form directional couplers of effective length correspondent to the cross-over length for the optical signal wavelength. By this, it is meant the length necessary for the light to switch completely from one waveguide to the other. If no voltage is applied the electrodes 116 and 118, the switch will transfer optical power from waveguide 106 to waveguide 110. Thus, the device is in the cross-over mode of operation if there is no voltage applied to the electrodes. Electrode 122 is connected to a voltage source 126 and electrode 124 is connected to a voltage source 128. Waveguides 106, 110 and electrodes 116, 122 thus form an upper directional coupler 130. Similarly, waveguides 108, 112 and electrodes 118, 124 form a lower directional coupler 132. In case the effective length of transfer of the directional couplers 130 and 132 is not the same for the two possible polarizations (TE and TM) of the optical signal, an intermediate effective length of transfer is chosen such that an acceptable level of cross-talk results.

Waveguides 110 and 112 are designed so that respective coupling from waveguides 106 and 108 will be maximum at the center of waveguides 110 and 112, and will decrease rapidly at the ends thereof. In this way, the response curve as a function of voltage is almost digital, with lateral lobes of the response curve being below 20 dB. As can be seen, the right-hand ends of waveguides 110 and 112 diverge away from waveguides 106 and 108. Thus, optical power coupled into waveguides 110 and 112 is disposed of either by absorption or dispersion into the air.

Assume that applying a positive voltage from voltage source 120 to electrodes 116 and 118 results in an increase of power transmitted into waveguide 106. In switch 100, a negative fixed voltage is applied from voltage source 126 to electrode 122 and a positive voltage is applied from voltage source 128 to electrode 124. These voltages are selected to be greater than half of the switching voltage of upper and lower directional couplers 130,132 and equal in absolute value to the operating voltage of the optical branching circuit formed by waveguide 102 and branching waveguide 104, determined on the basis of the desired isolation. Assume that application of a voltage in the order of 40 to 60 volts to electrode 114 guarantees, in the worst case of polarization and wavelength, an isolation of 15–30 dB between waveguides 106 and 108. In upper directional coupler 132, the voltage between electrodes 116 and 122 will be 80 to 120 volts, sufficient to make the exchange of power from waveguide 106 and 110 to be approximately less than −20 dB. In other words, directional coupler 130, under these operating conditions, has a negligible effect on optical power in waveguide 106 and power therein continues undisturbed to the output. For example, voltages from sources 120, 126, and 128 could be chosen to be 60V, −60V, and 60V, respectively.

In contrast, in lower directional coupler 132, the difference of potential between electrodes 118 and 124 will be zero, or null, so that essentially all optical power in the lower leg of branching waveguide 104 and in waveguide 108 will pass to waveguide 112, and will thus be disposed of. In other words, some residual optical power will flow in the lower leg of branching waveguide 104 and waveguide 108 due to non-ideal operation of the switching effect produced in branching waveguide 104 by action of electrodes 114, 116, 118. Flow of this residual power to the output (right end) of waveguide 108, will be minimized, however, by the action of lower directional coupler 132, which causes transfer of this residual power to waveguide 112.

If upper and lower directional couplers 130, 132 are not in a perfect cross state (that is, not all power from one of the waveguides of the directional couplers is transferred to the other waveguide) at zero voltage for both polarizations, the power extracted from the respective waveguide 106 or 108 in the "off" state will diminish, but there will be no additive losses to the other of waveguides 106 or 108, which is in the "on" state, since in any case, the coupling between two waveguides tends towards zero as the applied voltage increases.

Application of a negative voltage to electrodes 116, 118, 122 and a positive voltage to electrode 124 will cause an opposite condition. That is, transmission of optical energy will be enhanced in waveguide 108 and inhibited in waveguide 106. Coupling between waveguides 108 and 112 will be inhibited, and coupling between waveguides 106 and 110 will be enhanced.

Thus, the electrodes 114, 116, 118, 122, and 124 and voltage sources 120, 126, and 128 constitute a control structure coupled to first and second directional couplers 130, 132, input waveguide 102, and branching waveguide 104. The control structure is operative when energized to select between first and second operating states, the first state simultaneously: (1) enhancing transmission of optical energy coupled from input waveguide 102 through branching waveguide to waveguide 106, (2) inhibiting coupling of optical energy from waveguide 106 to waveguide 110, (3) inhibiting transmission of optical energy coupled from input waveguide 102 through branching waveguide 104 to the waveguide 108, and (4) enhancing coupling of optical energy from waveguide 108 to waveguide 112.

The second state simultaneously: (1) inhibits transmission of optical energy coupled from input waveguide 102 through branching waveguide 104 to the waveguide 106, (2) enhances coupling of optical energy from waveguide 106 to waveguide 112, (3) enhances transmission of optical energy coupled from input waveguide 102 through branching waveguide 104 to waveguide 108, and (4) inhibits coupling of optical energy from waveguide 108 to waveguide 112.

Figure 7:
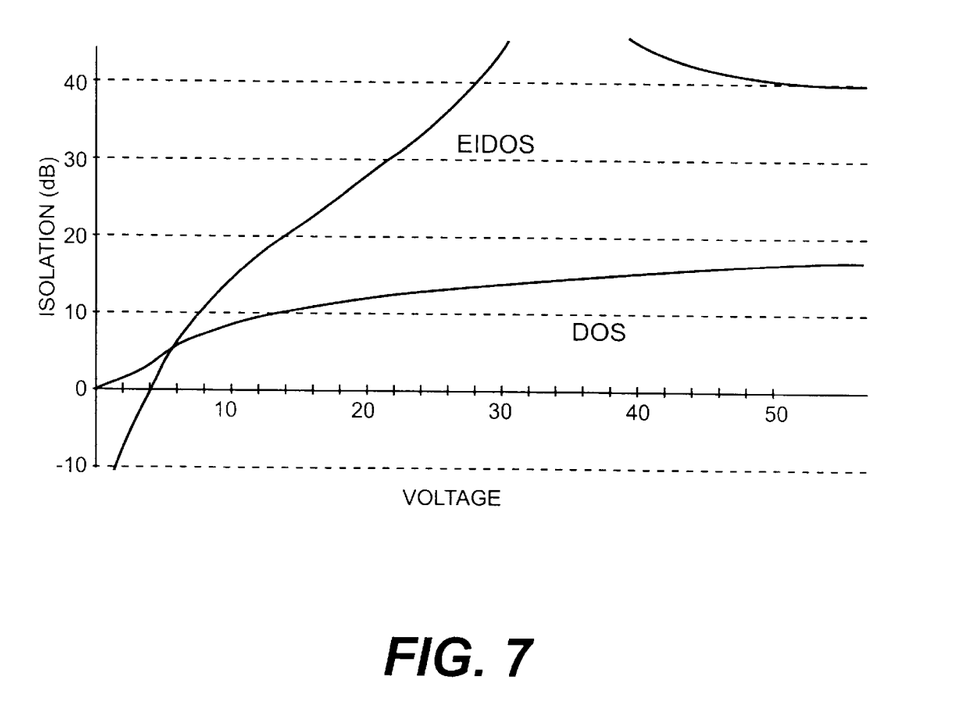
FIG. 7 is a graph similar to FIG. 4 comparing the isolation characteristics of a prior art digital optical switch and a digital optical switch constructed according to the principles of the present invention.

Thus, the isolation between waveguides 106 and 108 will improve by an amount dependent upon the efficiency of the cross-state of the directional couplers, so potentially it will be greater than or equal to 35–50 dB, as shown in FIG. 7.

The addition of directional couplers 130 and 132 causes a lengthening of the overall structure of the digital switch, but to a degree less than that caused by prior art enhanced isolation switches which include an intermediate stage. Furthermore, in such prior art switches, part of the overall length is used for connections between individual elements. However, with the present invention, directional couplers 130, 132 can be realized in the intermediate zones, thereby avoiding a waste of available space. It is estimated that a reduction of 30% to 40% in overall length of the switch can be achieved by the present invention.

Figure 8:
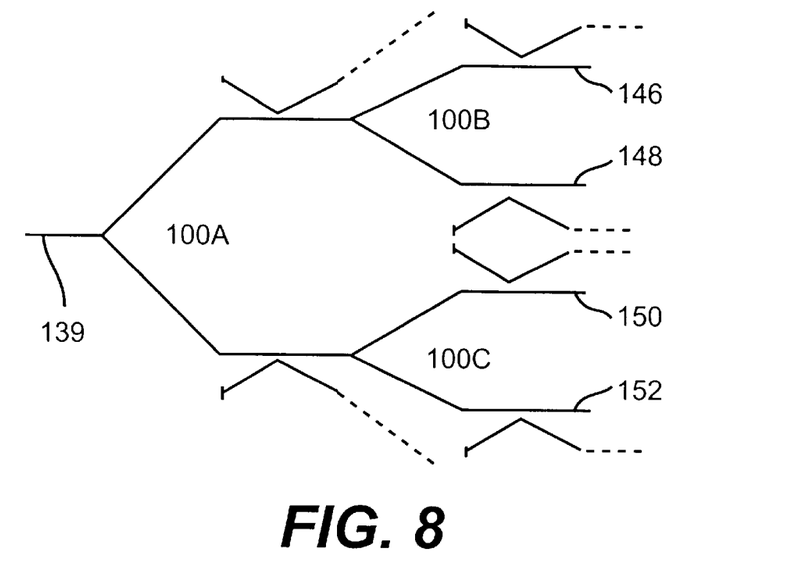
FIG. 8 is a schematic diagram of a 1×4 switching matrix using digital optical switches of the type shown in FIG. 6.

FIG. 8 is a similar diagram of a 1×4 switching matrix 139 based upon a combination of three switches 100 formed into a common substrate. Specifically, first, second, and third switches 100 are indicated by reference characters 100a, 100b, and 100c having outputs 146, 148, 150, 152. In a manner similar to FIG. 6, the outputs of directional coupler waveguides which are dissipated into the substrate are indicated by dotted lines.

Because of the characteristics of switch 100, a differentiated use of individual switches in matrix 139 is also possible in order to provide optimization of overall behavior. For example, if it is desired to select output 146 of matrix 139, switches 100a and 100b will be utilized as described above. All electrodes of switch 100c will be connected to ground. In this way, all the residual optical power of outputs 150 and 152 will be drastically reduced, if not eliminated.

Figure 9:
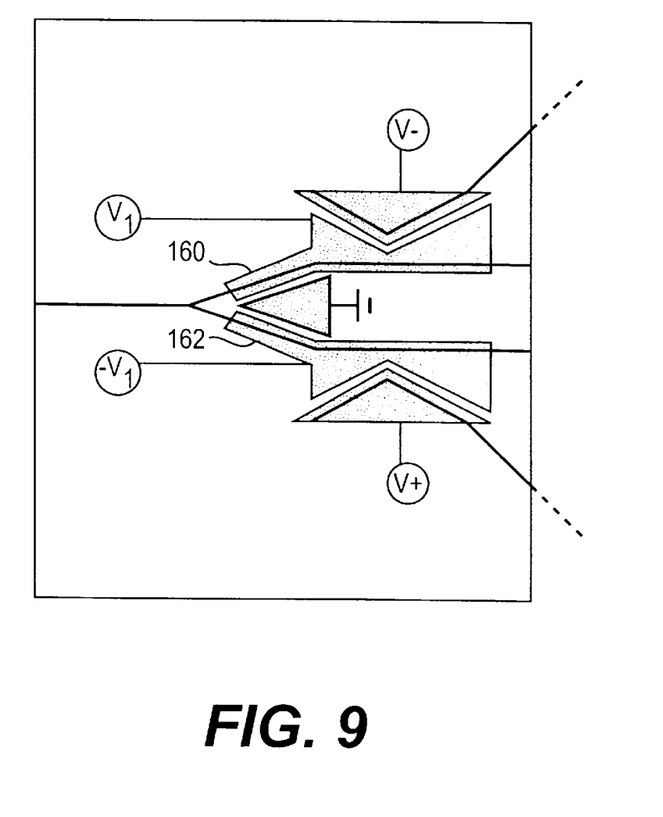
FIG. 9 is a drawing of a digital optical switch of the present invention incorporated on a Z-cut crystal $LiNbO_3$.

A digital optical switch embodying the present invention does not require a control circuit or a monitoring of optical outputs. Thus, the electronic portion of systems incorporating the switch is simplified. Assembly of such a system is also simplified. In the case of lithium niobate, the present invention permits the use of the most advantageous crystallographic cuts, i.e., the X-cut, from the point of view of switching voltage. Other types of crystallographic cuts, such as the Z-cut, may also be used, with appropriate rearrangement of the electrode locations, as is shown in FIG. 9. As is well known in the art, for a Z-cut crystal, it is necessary to place the control electrodes directly over the optical waveguides. For example, in FIG. 9, the electrodes which are used to alter the optical properties of the waveguides are located directly over the waveguides. Further, control voltages of opposite sign are applied to electrodes 160 and 162 to control the switching of light within the switch. Other than this change in electrode geometry, the invention of FIG. 9 operates as described earlier with regard to the X-cut embodiment.

Figure 10:
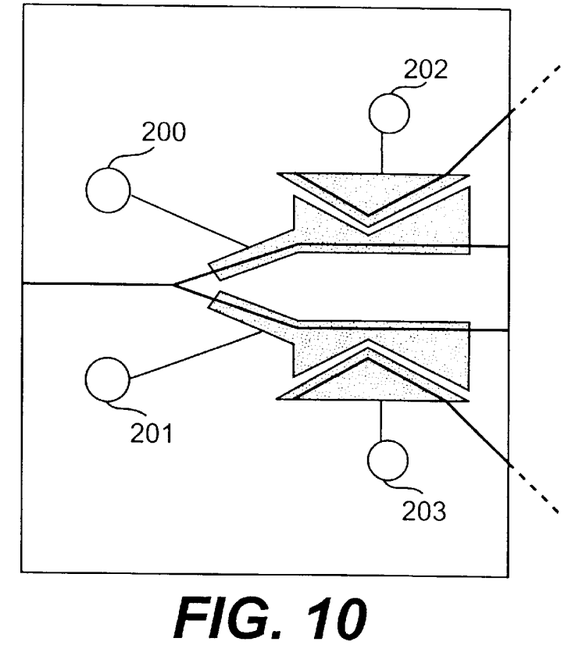
FIG. 10 is a drawing of a digital optical switch of the present invention incorporated on a thermo-optic substrate.

Moreover, the invention can also be used for optical switching devices using other types of substrates and functioning with other types of effects, for example, thermal-optic effects. When used with these other types of devices, appropriate substitutions would, of course, be made, as is well known to those skilled in the art. FIG. 10 illustrates an embodiment of the invention formed using a thermo-optic crystal and heater electrodes for heating the crystal, and thus changing its optical properties. For example, for use with thermo-optical devices, the electrodes would be replaced with heater electrodes. The substrate would be comprised of, e.g., a polymeric material, or silica, which have thermo-optic properties. In an exemplary switching device based on a thermo-optic material with a negative refractive index change with temperature, in operation a current would be applied to the heater electrodes 202 and 203. To switch light to the upper branch, heater 201 would receive current, while heater 200 would not. In this condition, the waveguides of the lower coupler would have the same refractive index and the coupler would remain in the cross state. To switch light to the lower branch, heater 201 would be turned off, and heater 200 would be turned on.

Figure 11:
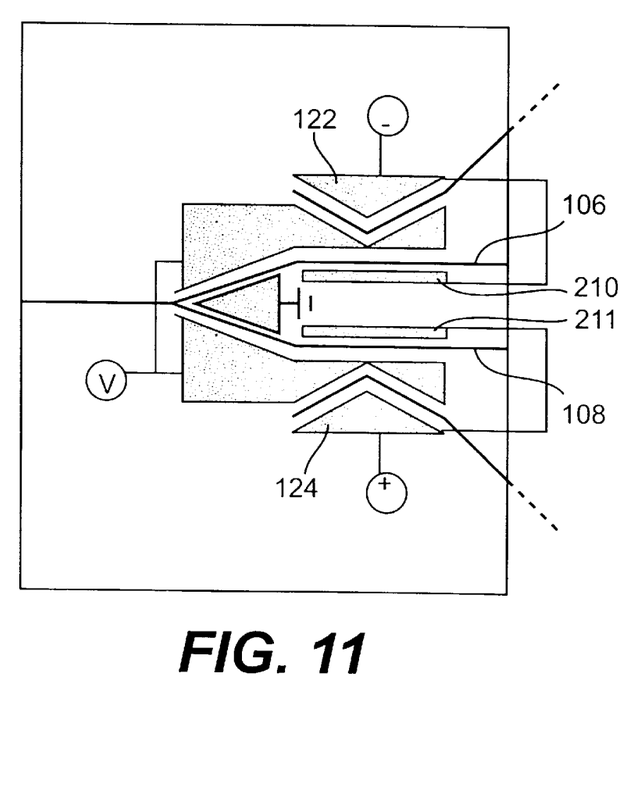
FIG. 11 is a drawing of an alternate embodiment of the present invention.

Another possible embodiment of this invention is illustrated in FIG. 11. There, two electrodes 210 and 211 are added to the inner edge of the waveguides 106 and 108, respectively. These inner electrodes 210 and 211 are electrically connected to the respective outer electrodes 122 and 124. This allows a decrease in the voltage necessary to reach the switching state for the coupler (or to increase the isolation at the same voltage level) because the directional coupler switch is thus operated in a push-pull configuration.

The additional electrodes do not have any effect on the cross state, since in this case the three electrodes of the coupler are at the same voltage and there is no electric field.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An integrated optical switch, comprising:
   a first directional coupler comprising first and second waveguides;
   a second directional coupler comprising third and fourth waveguides;
   an input waveguide;
   a branching waveguide directly connecting the input waveguide to the second and third waveguides; and
   a control structure coupled to the first and second directional couplers, the input waveguide, and the branching waveguide and operative when energized to select between first and second operating states;
   the first state simultaneously: (1) enhancing transmission of optical energy coupled from the input waveguide through the branching waveguide to the second waveguide, (2) inhibiting coupling of optical energy from the second to the first waveguides, (3) inhibiting transmission of optical energy coupled from the input waveguide through the branching waveguide to the third waveguide, and (4) enhancing coupling of optical energy from the third to the fourth waveguides; and
   the second state simultaneously: (1) inhibiting transmission of optical energy coupled from the input waveguide through the branching waveguide to the second waveguide, (2) enhancing coupling of optical energy from the second to the first waveguides, (3) enhancing transmission of optical energy coupled from the input waveguide through the branching waveguide to the third waveguide, and (4) inhibiting coupling of optical energy from the third to the fourth waveguides.

2. An integrated optical switch as recited in claim 1, comprising a substrate, and wherein the first waveguide, second waveguide, third waveguide, fourth waveguide, input waveguide, and branching waveguide are each formed in the substrate.

3. An integrated optical switch, comprising:
   a substrate;
   a first waveguide formed in the substrate and constituting an input waveguide;
   second and third waveguides each formed in the substrate and constituting an output waveguide,
   a branching waveguide formed in the substrate and having first and second legs connecting the first waveguide respectively to the second and third waveguides;
   a fourth waveguide formed in the substrate and positioned with respect to the second waveguide so as to form a first directional coupler;
   a fifth waveguide formed in the substrate and positioned with respect to the third waveguide so as to form a second directional coupler;
   a first electrode positioned between the second and third waveguides, a second electrode positioned between the second and fourth waveguides;

a third electrode positioned between the third and fifth waveguides;

a fourth electrode positioned on the side of the fourth waveguide opposite the second electrode; and a fifth electrode positioned on the side of the fifth waveguide opposite the third electrode.

4. An integrated optical switch as recited in claim 3, comprising a conductor electrically connecting the second and third electrodes.

5. An integrated optical switch as recited in claim 4, comprising a conductor connecting the first electrode to ground potential.

6. An integrated optical switch as recited in claim 5, wherein a first polarity voltage is supplied to the fifth electrode and a second polarity voltage is supplied to the fourth electrode, and operable between two electrical states; wherein the first electrical state simultaneously supplies a first polarity voltage to the second and third electrodes; and the second electrical state simultaneously supplies a second polarity voltage to second and third electrodes.

7. An integrated optical switch as recited in claim 6 wherein:

the branching waveguide splits optical power received from the first waveguide into substantially equal amounts in the first and second legs upon application of a null voltage to the second and third electrodes, and the branching waveguide supplies substantially all optical power received from the first waveguide to one of the first and second legs upon application of a first switching voltage value to the second and third electrodes;

the first and second directional couplers each couple optical power from one of the waveguides of the directional coupler to the other waveguide of the directional coupler upon application of a null voltage to the coupler, and the first and second directional couplers each respond to application of a second switching voltage value to inhibit coupling of optical power from one of the waveguides of the directional coupler to the other waveguide of the directional coupler.

8. An integrated optical switch, comprising:

a substrate;

a first waveguide formed in the substrate and constituting an input waveguide;

second and third waveguides each formed in the substrate and constituting an output waveguide, a branching waveguide formed in the substrate and having first and second legs connecting the first waveguide respectively to the second and third waveguides;

a fourth waveguide formed in the substrate and positioned with respect to the second waveguide so as to form a first directional coupler;

a fifth waveguide formed in the substrate and positioned with respect to the third waveguide so as to form a second directional coupler;

a first electrode positioned between the second and third waveguides, a second electrode positioned above the first leg of the branching waveguide and the second waveguide;

a third electrode positioned above the second leg of the branching waveguide and the third waveguide;

a fourth electrode positioned above the fourth waveguide;

a fifth electrode positioned above the fifth waveguide.

9. An integrated optical switch as recited in claim 8, wherein the second and third electrodes are connected to a voltage source.

10. An integrated optical switch as recited in claim 9, wherein the fourth and fifth electrodes are connected to ground.

11. An integrated optical switch comprising:

a substrate of thermo-optical material first waveguide formed in the substrate and constituting an input waveguide;

second and third waveguides formed in the substrate and constituting output waveguides;

a branching waveguide formed in the substrate and having first and second legs connecting the input waveguide to the output waveguides;

a first heater electrode formed over the first leg of the branching waveguide and the second waveguide;

a second heater electrode formed over the second leg of the branching waveguide and the third waveguide;

a fourth waveguide formed in the substrate and positioned with respect to the second waveguide so as to form a first directional coupler;

a third heater electrode formed over the fourth waveguide;

a fifth waveguide formed in the substrate and positioned with respect to the third waveguide so as to form a second directional coupler;

a fourth heater electrode formed over the fifth waveguide; and electrical power means to supply electrical power to any of the first, second, third, or fourth heater electrodes.

12. A method for switching optical power, comprising:

receiving optical power into a Y-switch having an input leg directly connected to first and second output legs, each of the output legs being connected to a respective one of first and second output waveguides, each of the output waveguides constituting a first coupler waveguide of respective first and second directional couplers, each of the first and second directional couplers also including a second coupler waveguide; and simultaneously applying: (1) a first switching voltage to the Y-switch to cause the received optical power to switch to the first output leg and be transmitted to the first coupler waveguide of the first directional coupler, (2) a second switching voltage to the first directional coupler to inhibit transfer of optical energy to the second coupler waveguide of the first directional coupler, and (3) a third switching voltage to the second directional coupler to enhance transfer of optical energy to the second coupler waveguide of the second directional coupler.

* * * * *